United States Patent [19]

Nichols et al.

[11] Patent Number: 5,401,459
[45] Date of Patent: Mar. 28, 1995

[54] GAS-ASSISTED INJECTION MOLDING OF HOLLOW RIBBED ARTICLE

[75] Inventors: James M. Nichols, Old Saybrook, Conn.; Roy E. Moore, Jr., Cumming, Ga.

[73] Assignee: Infiltrator Systems, Inc., Old Saybrook, Conn.

[21] Appl. No.: 956,602

[22] Filed: Oct. 5, 1992

[51] Int. Cl.⁶ .................. B29C 45/00; B29D 22/00
[52] U.S. Cl. .................. 264/572; 264/328.8; 264/328.12; 264/328.13
[58] Field of Search .......... 264/328.8, 328.12, 328.13, 264/572

[56] References Cited

U.S. PATENT DOCUMENTS

| | | | |
|---|---|---|---|
| 4,101,617 | 7/1978 | Friedrich | 264/572 |
| 4,136,220 | 1/1979 | Olabisi | 428/188 X |
| 4,234,642 | 11/1980 | Olabisi | 428/188 |
| 4,247,515 | 1/1981 | Olabisi | 264/500 |
| 5,054,689 | 10/1991 | Hunerberg et al. | 239/412 |
| 5,135,703 | 8/1992 | Hunerberg et al. | 264/572 |

OTHER PUBLICATIONS

Rusch, K. C. "Gas-Assisted Injection Molding—The New Thermoplastic Molding Technology for Exterior Body Panels". Paper Presented at a Meeting of the Society of Automotive Engineers, Mar. 2, 1989 (pp. 1–8).
Detroit Plastic Molding "Gas Assisted Injection Molding" Brochure 6 pages (unknown date).

*Primary Examiner*—Leo B. Tentoni
*Attorney, Agent, or Firm*—C. G. Nessler

[57] ABSTRACT

Improvements in articles, made by gas assisted injection molding of polyethylene and other materials, such as large arch shaped subsurface leaching conduits, and the processes by which they are made, are disclosed. The improvements involve control of which portions are hollow and which are solid, and include a stepped rib, where the thinner upper rib portion is solid and the wider base is hollow; articles having corrugated surfaces strengthened by ribs on both sides, where the hollows of the opposing side ribs are connected through holes in the undulating walls; articles having ribs which are narrowed where they are solid, compared to their width where they are hollow; and, articles having thinned wall regions surrounding sprues, to avoid undesired hollowing during injection molding.

7 Claims, 3 Drawing Sheets

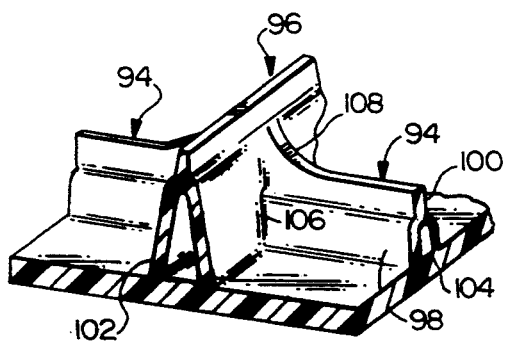
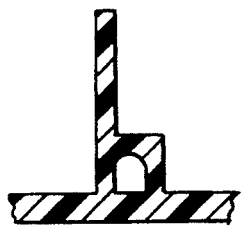
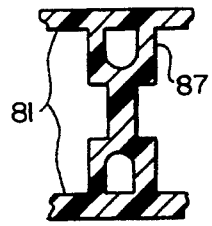
FIG. 7    FIG. 15    FIG. 16
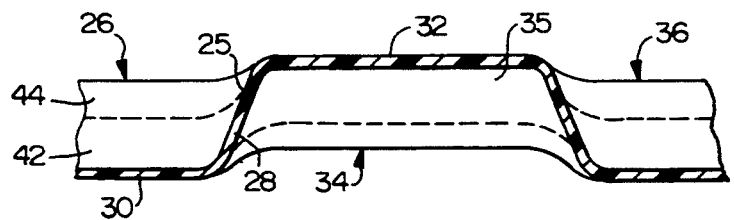
FIG. 8
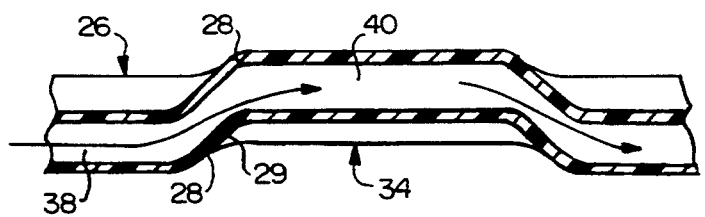
FIG. 9

GAS-ASSISTED INJECTION MOLDING OF HOLLOW RIBBED ARTICLE

TECHNICAL FIELD

The present invention relates to molded articles, in particular to structural thermoplastic articles having a combination of hollow and solid parts.

BACKGROUND

Load bearing molded thermoplastic articles for structural applications often have ribs and like features to provide strength. For example, a molded pallet will have an egg-crate pattern of ribs. As another example, a molded arch shaped conduit for dispersing and gathering liquids in the earth, described in U.S. Pat. Nos. 4,759,661 and 5,017,041 (having common inventor and assignee herewith) has ribs in addition to corrugations, so that when buried in the earth it will resist the weight of the earth and vehicles. Such articles are typically made by injecting hot polyethylene into a relatively cold die.

An improved method of making large polyethylene objects like the conduit involves injecting nitrogen or another nonreactive gas into the mold before the thermoplastic hardens. Thus, hollow walls are formed in the articles where they would otherwise be thick. See U.S. Pat. Nos. 4,247,515, 4,234,642, 4,136,220, all to Olabisi, and U.S. Pat. No. 4,101,617 to Friedrich. The technique reduces the injection pressure which is required for flowing plastic to the far reaches of the mold, reduces the amount of polymer needed, and speeds the injection molding cycle time. When ribbed products are made, the thicker cross section ribs will desirably be hollowed.

As the foregoing gas assisted injection molding process is commercially known and is related to ordinary injection molding, many essential principles for product shape and mold design are known. However, there are process limitations which give less than the desired product properties and dimensions. One problem is a tendency of ribs to have areas which are not desirably hollowed out, since gas sometimes pushes molten plastic from opposing directions whereupon it is trapped and forms a block, as described in U.S. Pat. No. 4,234,642. Such a region will not cool as fast as the rest of the adjacent hollow structure, undercutting the expected faster cycle time, or producing localized distortion and surface shrinkage. Another problem occurs, as in the leaching conduit, where a strengthening rib butts against an undulation of the corrugation, insofar as controlling hollowness and obtaining good strength at the butt joint. Still another problem results when residual pressurized gas, trapped in the molded part, upon removal causes wall eruptions at locations which are insufficiently cooled or have very thin walls. Thus, there is a need for improvment in the technology of molding and design for this kind of product and process.

SUMMARY OF THE INVENTION

An object of the invention is to provide gas assisted injection molded articles which have more consistent and better combination of solid and hollow regions. Another object is to minimize the cycle time of making such products while reducing any propensity for distortion at local areas of the molded article.

In accord with the invention, selective areas of an article are thinned and hollowed, compared to what a conventional design would entail. In one mode, a rib strengthening a wall or surface has a stepped cross section. The base of the rib is substantially hollow and the thinner upper part is solid; they are connected by a transition zone. During gas assisted injection molding, the relative proportions of the rib parts effect the desired solid and hollow combination due to the dynamics of cooling of the hot thermoplastic. In the preferred rib the base and upper part are of essentially constant width, i.e., rectangular in cross section; the base is substantially hollowed so the hollow is essentially shaped like the base cross section; and, the transition section has a short vertical length and is solid.

In further accord with the invention, an article with an undulating or corrugated surface has ribs running on one side and then the other, crosswise to the undulating surface. The hollow parts of the ribs are connected to one another through holes in the webs of the undulating surface. In particular, a leaching conduit is thus strengthened.

In further accord with the invention, an article has a grid of intersecting ribs, and certain ribs which tend toward being solid because of opposing flows of plastic are narrowed, compared to the adjacent hollowed ribs, so that the rib array is comprised of solid thin ribs and wider hollow ribs. Such construction avoids heavy solid sections which would cool too slowly and impede rapid production of properly shaped parts. In further accord with the invention, an article has a thinned wall section in the vicinity of the injection port or sprue, with the extent varying according to whether a rib is present. This avoids gas flow through the wall and undesired hollowing of it.

The foregoing improvements embody better management of, or response to, the flow of mold material and gas in the mold which defines the article. They result in a product which is less prone to local distortion and which has more dependable structural strength. The invention is applicable to leaching conduits and other structural articles made of plastic and like-behaving materials.

The foregoing and other objects, features and advantages of the invention will become more apparent from the following description of the best mode of the invention and accompanying drawings.

BRIEF DESCRIPTION OF THE DRAWINGS

FIG. 7 shows two intersecting stepped ribs, one of lesser height than the other.

FIG. 8 shows a side view of the corrugated part of FIG. 2, illustrating how aligned ribs run on the upper and lower surfaces of the corrugation.

FIG. 9 is similar to FIG. 8, showing the ribs in cross section and the connecting of the hollows of each through the web of the corrugation.

FIG. 15 shows in cross section a stepped rib in the shape of an "h".

FIG. 16 shows in cross section a stepped rib having an additional opposing base.

DESCRIPTION OF THE BEST MODE

The invention is in part described in terms of an improvement of a leaching conduit described in U.S. Pat. No. 5,017,041, disclosure of which is hereby incorporated by reference. A typical leaching conduit is about 3 ft wide, 6 ft long, and ranges in height from 12–25 inch; it is made of high density polyethylene (Specific Gravity greater than 0.95), with chopped fiberglass, and weighs about 26–36 lb. It has a corrugated arch shape; strengthening ribs run both lengthwise and along the arch width, on the exterior and interior.

The article is made by a commerically known gas assisted injection molding process generally in accord with the teachings of the aforementioned Olabisi patents and Friedrich patent, the disclosures of which are hereby incorporated by reference. The method comprises injecting a quantity of polyethylene into a water cooled mold clamped in an injection molding machine, to partially fill the mold. Shortly thereafter, while the plastic is still hot and flowable, nitrogen gas is injected to push the molten plastic to the far reaches of the mold. Flow of gas desirably hollows out the larger cross sections of the part within the mold. After sustaining the pressure and allowing the part to cool, the gas pressure is released and vented. The mold is then opened and the part is removed for further cooling to room temperature. To make an article as large as the leaching conduit, multiple injection ports are used. Smaller articles may require only one injection port. Of course, sprue systems, runners, etc., may be used to distribute plastic from a single central port in some applications.

In the description which follows, for simplicity, repetitious distinction is not made between the mold which defines the article and the article which is the product of the mold. It is obvious to the artisan what the connection is, in that in injection molding the mold replicates the part, other than for unwanted distortions or defects and slight overall dimensional deviations as a result of final cooling.

Figure 1:
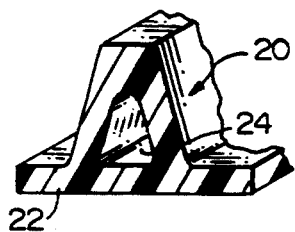
FIG. 1 shows a rib cross section of the prior art.

FIG. 1 shows a typical prior art rib in cross section. The truncated triangle cross section rib 20 is mounted to strengthen a wall 22; the hollow interior 24 corresponds only loosely to the rib shape, especially at the top where the relatively cold mold has the greatest effect owing to the part surface area to volume relationship. The plastic, becoming more viscous, resists the flow of gas. The shape and degree of hollowness of the rib depends on the mold, gas and polymer parameters and usually will vary along the length of a rib, especially as the rib intersects other parts of the molded structure. The prior art shows in many instances hollows that have rather little conformance with the shape of the rib or other section that contains them.

Figure 14:
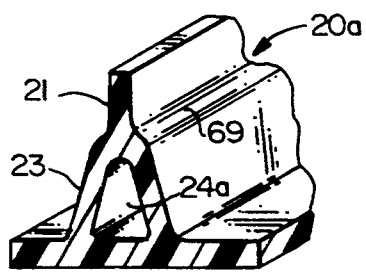
FIG. 14 shows a rib having a base like that of the prior art rib of FIG. 1, illustrating how the upper part increases the size and shape of the hollow.

A stepped rib of the present invention has an upper part mounted atop the base, and the effect of such is illustrated by comparing the base 23 of stepped rib 20a in FIG. 14 with the rib 20 of FIG. 1; rib base 23 has essentially the same size as in the rib 20. The upper part 21, containing hot plastic during molding, retards the cooling of the top portion of the base. As a result the gas injection will hollow the base more than if the upper part was not present. Thus the interior hollow 24a substantially conforms with the shape of the base 23, more than is the case for ribs in the prior art. This is an advantage in that more hollowing of any section reduces weight and facilitates delivery of plastic and gas to points along the rib length. Of course, the rib 20a also has an advantage over the rib 20 in that it has a section modulus which is more favorable owing to the upper part.

Figure 3:
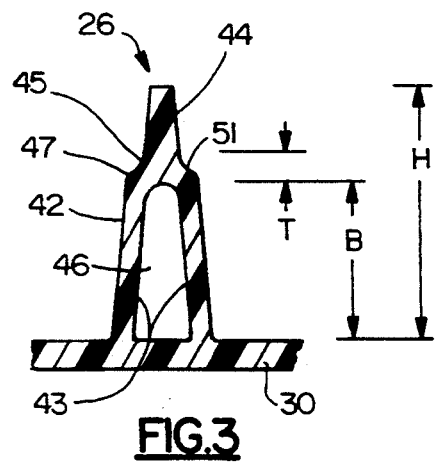
FIG. 3 shows in cross section a most preferred stepped rib having a solid upper part and hollow base, both essentially rectangular, joined by a transition zone comprised of two small radius curves.

A typical stepped rib 26, shown in more detail in FIG. 3, has a hollow base 42 and an integral narrower width solid upper part 44. The base 42, resting on a wall 30, has a height B and an oblong hollow cavity 46 which substantially conforms to the shape of the base. The relatively severe cross section or width change, between the base and upper part, along the relatively short transition zone vertical axis length T ensures injected gas will only hollow the wider base, and not the upper part or transition zone. The narrowness of the upper part is such as to cause polymer in that part to sufficiently cool and become more viscous, so it resists flow of the injection gas. The gas preferentially flows through the wider, greater unit volume-to-surface area ratio, and therefore warmer, base. Since the base is warmer than the upper part, the viscosity of the plastic there is less than in the upper part. The base cools with the rest of the rib and article, but its cooling is sufficiently small, so that the increase in viscosity of the plastic there does not prevent flow of gas therethrough. Thus, the base is made substantially hollow while the upper part is solid, even when temperature and pressure vary somewhat within the mold along the rib length. The base walls 34 vary in thickness, being thicker near the transition zone, but they nominally define an interior space which is substantially rectangular like the base cross section, albeit with a rounded top end.

A rib usually serves both a structural function and a polymer/gas distribution function. Accordingly, the proportions of the height and width of the upper part and base parts, may vary substantially. A preferred rib like that of FIG. 3, used on a leaching conduit having a nominal ⅛ inch wall, will have an overall height H of about 1.4–1.7 inch; a nominal rectangular cross section base having a width of about 0.3–0.5 inch; and, a nominal rectangular cross section upper section width of about ⅛ inch and a height of about ¼ to ½ inch. (The widths of each part are essentially constant, within the context of having a mold draft of 0–5 degree per side.) The transition zone between the base and upper part will be about 1/16 to ⅛ inch in vertical length, comprised of a fillet 45 and a base top edge curve 47, each of about 1/32 inch radius, connected by a fairing-in surface 51. Thus, the transition zone length is less than about 10 percent of the overall height. Typically, the walls 43 of the base are 1/16 to ⅛ inch thick, most typically and preferably about 3/32 inch.

In work thus far on large structural objects, a preferred rib will have the following dimensions and proportions: The base will be about 2 to 4, preferably 3, times wider than the upper section; and, the walls of the base will be between about ¼ to 1 times the width of the upper section. For example, if the upper part is ⅛ inch wide, the base will be ⅜ inch wide and the base walls will be 1/32 to ⅛ inch thick. Of course, the wall width (and hollowness) will vary somewhat along the length of the rib, according to variation in influential parameters (polymer temperature, gas pressure, etc.) at any particular point.

Preferably, the height B of the base will be between about 30 and 85 percent, preferably between about ⅓ and ⅔, of the height H of the overall rib. Thus, by example, a 1.5 inch high rib will have a base which is 0.5–1 inch high. Smaller upper parts are feasible; the rib upper part may have a height equal to its width, which width is less than the width of the base. By example, a minimal size upper part might be ⅛ inch wide and ⅛ inch high.

Figure 4:
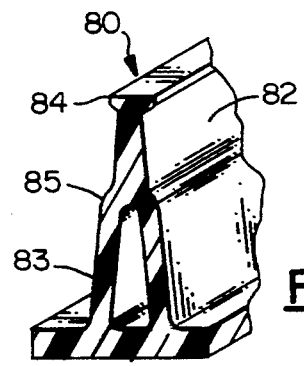
FIG. 4 shows in cross section a stepped rib having tapered walls and an angled surface transition zone.

The cross section shapes of the preferred base and upper part described above and shown in FIG. 3 are essentially rectangular, i.e., they are constant in width, making allowance for the mold draft. Non-rectangular shapes are within the scope of the broad invention. For example, FIG. 4 shows a rib having a more complicated cross section within the scope of the invention. The rib 80 has somewhat tapered base 83 and upper part 82; the latter is surmounted by a small flange 84. The transition zone is characterized by a surface 85 angled upwardly from the topmost edge of the base toward the rib vertical axis. This contrasts with the nearly horizontal analogous surfaces 69, 71 of the ribs shown in FIGS. 14 and 6. Transition zone surfaces, flat or curved, nominally angled at less than 45 degrees from the horizontal are preferred, particularly in ribs of the preferred dimensions described above. The choice of shape depends in part on the widths of the base and upper part adjacent the transition zone.

The transition zone is a portion of the rib wherein there is a substantial change in unit cross section—or more simply, width—along the vertical axis of the rib. The transition zone may vary in severity in the ways described herein, so long as it is combined with both a base that has sufficiently great width at its upper end (near the transition zone) to produce the substantial hollowness of the rib base part, and with a rib upper part that has a sufficiently small width at its lower end (near the transition zone) to produce the solidity of the upper part. The preferred transition zones will have shapes that result in solid transition zones, as well. As should be evident, when the base or upper part is tapered, the width of such tapered part which is nearest or adjacent the transition zone is the width of most significance in the practice of the invention, for it is the relationship between such width and the lower end of the upper part which characterizes the desired transition zone.

Figure 5:
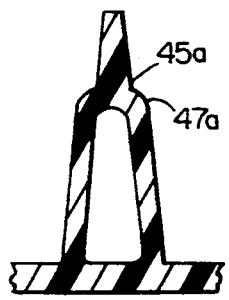
FIG. 5 shows the cross section of another stepped rib, where the transition zone is comprised of curved top edges on the base top.
Figure 6:
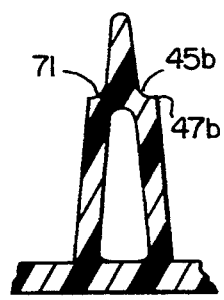
FIG. 6 shows the cross section of another stepped rib, where the transition zone is comprised of curves or fillets at the base of the upper part.

FIGS. 5 and 6 illustrate other variations of transition zones. The transition zone of the FIG. 5 rib is comprised of a curve at the upper edge 47a of the base and a "zero radius" (i.e., minimum technically feasible radius) or inside corner fillet 45a at the bottom of the upper part. FIG. 6 shows a zero radius at the upper edge 47b and a concave curved fillet at the inside corner 45b. Of course, zero radii at both places would also comprise a transition zone.

Another variation within the invention is shown in the rib of FIG. 15, where the upper part is offset from the center of the base, so the rib has an "h" cross section. Still another variation is shown in FIG. 16, where the rib has another "base" 87 at atop the upper part, and where the cross section of the part is shaped like an "I". FIG. 16 may also be characterized as comprising two opposing ribs joined at the tops of their upper parts. The construction shown in FIG. 16 will be useful at the periphery of articles, when the wall portions 81 on one side will be omitted; changing to the FIG. 15 "h" rib design for such will produce a straight sidewall on an article, with two hollows.

Figure 2:
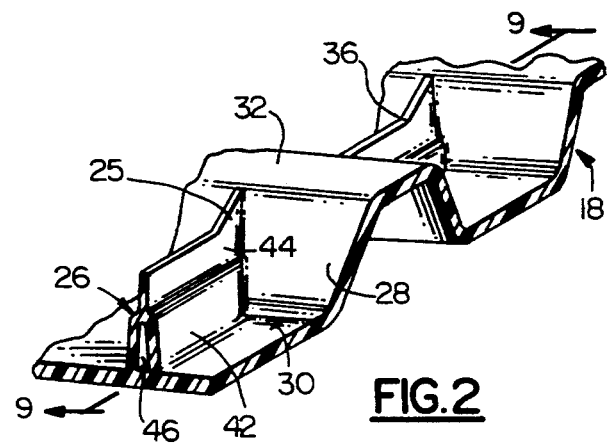
FIG. 2 shows a portion of the top arch of a corrugated arch shaped leaching conduit, having ribs running crosswise to the undulating surface.

FIG. 2 shows how stepped ribs 26, 36 strengthen a section 18 of the top of a leaching conduit having an arch shape. In the conduit, corrugations run along the arch shape, transverse to the conduit length. The corrugations impart rigidity in the transverse direction, while a multiplicity of ribs like ribs 26,36 provide strength in the lengthwise or axial direction. (Additional, solid ribs mostly, along with some hollow ribs, run perpendicularly to ribs 26, 36 to strengthen further the relatively flat portions of the peaks and valleys. For simplicity they are not shown here, but they are discussed below.

FIG. 7 shows an advantage of the stepped rib shape, as when a stepped rib 94 perpendicularly intersects another stepped rib 96 having a comparatively larger hollow base 102. When one hollow rib intersects another, the wall of the intersected rib will have a hole in it and be weakened. In FIG. 7 the smaller rib 94 has a base 98 with a hollow 104 and a solid upper part 100. The sidewall of the base 102 of the larger rib is penetrated and thus weakened where the hollow 104 intersects it, at the joint 106. The effect of this weakening is lessened by both the fact of the solid upper part 100 and by the upper part being sloped upward at gusset 108. Thus, the solid upper parts of the ribs are joined, obtaining good solid-to-solid structural connection.

Another mechanical advantage of the stepped rib is evident when it is used on a corrugated leaching conduit and other structures with undulating surfaces. The advantage lies again in having the solid upper part. As shown at FIG. 2, the rib 26 intersects an undulating wall surface, namely the web 28 which connects a valley corrugation 30 and a peak corrugation 32. Because the rib height is less than the web height the solid rib upper part 44 is sloped upward to the top of the peak by a gusset 25. The stepped rib has greater section modulus than a rib lacking the upper part; and confining the hollowness to the base provides more integrity at the web-rib joint, as for the intersection of two ribs, previously described.

FIGS. 8 and 9, side views of the FIG. 2 structure, reveal another typical strengthening rib 34 inside the peak corrugation. The rib 34 is axially aligned with the exterior rib 26, as well as with rib 36 in the next valley. The stepped ribs 26, 34, 36 on the upper and lower surfaces are sized and curved at the web, so that, e.g., hollows 38, 40 of the bases 42, 35 connect. Thus, on injection, polymer and hollowing gas flow, as indicated by the arrows, from rib 26 to rib 34, through passage 29 in the wall of the web and finally to other regions, e.g., the end of the mold and part. Thus, the web will be made stronger than it would be if the ribs were not stepped but were of the same height and wholly hollow, or if the ribs where comprised only of the base portions.

Of course, the principle of this aspect of the invention—having hollowed ribs which connect through the undulating surface—can nonetheless be practiced with plain and unstepped ribs, but with less advantageous result.

Figure 10:
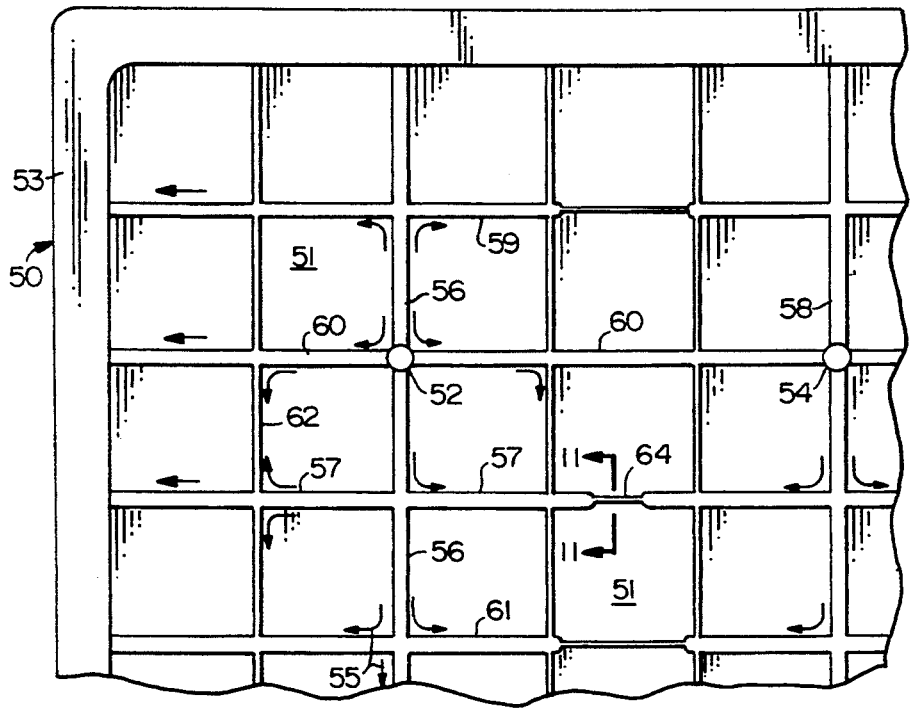
FIG. 10 shows a part of the bottom of a rectangular pallet having intersecting ribs, some of which are narrowed where they are solid.

As indicated in the Background, when the ribs are uniformly sized there is some tendency for plastic to be pushed along a rib by the gas injection, and then to meet other plastic pushed opposingly, thus forming solid regions in what would otherwise desirably be hollow ribs. These solid regions are slower cooling, and they tend to be sunken in and distorted in the final product. FIG. 10 shows part of an article in which this problem has been overcome by a combination of thick and thin ribs. The Figure shows the underside of a part 50 of a pallet having an array of ribs, e.g., 56, 62, 58, 60, 64, 59, supporting a flat upper surface 51. The ribs terminate at a circumscribing pallet rim 53. Some ribs are intentionally made larger in cross section than others. Arrows 55 indicate the direction of typical gas flow in the mold when the part is formed. Of course, it is the nature of the process that the plastic first injected does not fill the extremities of the mold, and the gas accomplishes this purpose, pushing the plastic into thinner sections, and hollowing it in thicker sections, e.g., ribs.

Figure 11:
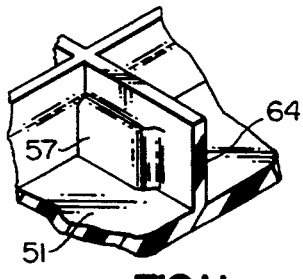
FIG. 11 shows a detail of part of a rib in FIG. 10, where the rib is narrowed along the part of its length where it is solid.

To fill the mold, plastic, followed by gas, is injected at spaced apart port/sprue locations 52, 54. For example, when injected, the gas from the port 52 flowing through rib 56 will tend to push polymer also through the perpendicular running ribs, e.g., 57, 59, 60, 61, of course, to the extent they are not so thin and already filled that the plastic has become too viscous to move further. The material in these perpendicular ribs will tend to flow through ribs connecting them. If hypothetically, an article was made with all ribs equally sized and aimed at carrying gas, some would end up being solid. Such result might also be calculated or empirically determined. For an example, suppose material coming from ribs 60, 57 into rib 62 would make 62 filled and solid. Thus, in the practice of the invention, that rib is made narrow. Likewise, when only a part of a rib would tend to be solid, only a portion thereof would need be narrowed. This is illustrated in FIG. 10, where part 64 of a rib 57 is made narrow. FIG. 11 shows the part in better detail.

Thus, ribs are narrowed where opposing flows meet to form solid ribs. The narrow ribs in these regions, having less mass of hot plastic will thus be better cooled—nominally as fast as the other ribs which are hollowed out by the gas. Not all the ribs where the opposing flows meet will tend to be solid, as it depends on the things connecting to the ribs. For instance, rib 60 running directly between sprues 52,54 is shown unnarrowed, because the temperature and flow conditions, including flow into branch ribs, are such that the rib does not tend toward being solid. Again here, the stepped rib is preferred but the principle will be applicable to other shape ribs. The invention will be useful for other patterns of ribs, and for like features. For example, if the rim 53 which circumscribes tends toward having a solid portion in an otherwise hollow structure, the local portion may be thinned.

The typical leaching conduit described earlier will preferably employ the combination of solid and hollow ribs just described. In it, the hollow ribs will predominately run lengthwise to the conduit, and perpendicular to the corrugations and arch cross section. See the earlier description of how stepped ribs are applied to the conduit. Ribs running transversely, or along the arch length, will be predominately solid. Some transverse ribs will carry gas, of course, from the injections ports/sprue regions, and between the lengthwise ribs.

Another problem is found when gas is injected at the sprues or injection port locations 52, 54, and a desired solid wall adjacent to a port is found to be hollow or distorted. It appears that the greater heat flux in the sprue region, with resultant heating of the mold and slower cooling of plastic, enables gas to undesirably flow locally through the walls in addition to the ribs. Walls will be undesirably thinned and weakened, and worse, may bulge if there is any retained pressurized gas and it pushes outwardly as the still warm part is removed from the mold.

Figure 12:
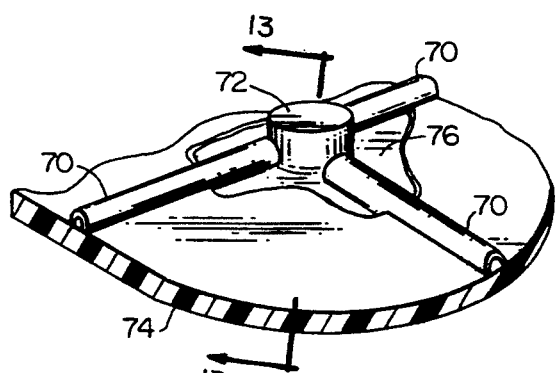
FIG. 12 shows part of an article having ribs running from a sprue, and a thinned wall surrounding the sprue region.
Figure 13:
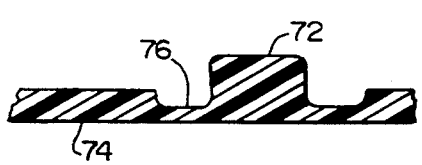
FIG. 13 shows a cross section of the sprue and wall of FIG. 12.

To overcome this problem the mold and the resultant wall of the article are thinned around the boss or sprue formed by the port, as shown in FIGS. 12 and 13. Hollow ribs 70 radiate from the sprue 72 across the solid wall 74 of a portion of an article. Surrounding the boss is a thinner wall region 76. It will be noted that the thin region 76 extends further from the sprue in the direction the ribs run, since the heating is greater in these directions and it is undesirable to unduly thin the wall where not required, for structural reasons. The resultant thinned area 76 has a cloverleaf like appearance, with the number of leaves a function of the number and direction of ribs. As an example, the wall 74 will have a typical thickness of 0.12–0.15 inch, and the thinned area 76 will be 1/32 inch or more thinner—about 20–25% thinner—with a typical thickness of 0.07–0.12 inch. The thinned area will extend about 2 inch along the length of a ⅜ inch wide by 1.5 inch high rib running from a ½–¾ inch dia sprue.

Providing the article with a thinned wall portion circumscribing the sprue increases the cooling of hot plastic to a greater extent than would occur when the wall is not thinned. The plastic in the thinned wall region thus becomes viscous to the extent that it resists the flow of injected gas through it. At the same time, the plastic in the ribs does not cool and become viscous as much. Thus, the thinned wall portion will desirably be solid and the rib will be hollow.

While the invention has been described with respect to the molding of polyethylene articles it will be applicable to the molding of other organic and inorganic materials, as mentioned in the Olabisi patents, and combinations of materials.

Although only the preferred embodiment has been described with some alternatives, it will be understood that further changes in form and detail may be made without departing from the spirit and scope of the claimed invention.

We claim:

1. In a process of gas assisted injection molding, of the type wherein heated molding material, followed by gas, is injected through a port in a mold, to form an article having a solid wall of a first thickness with a hollow rib attached thereto, wherein the port forms a sprue in the article at a location along the wall where lies the hollow rib, the improvement which comprises:

providing the article with a thinned wall portion circumscribing the sprue; the thinned wall portion having a wall thickness less than the wall first thickness, to thereby increase cooling of heated material in the thinned wall portion to a greater extent than occurs when the wall is not thinned, and to make the molding material in the thinned wall portion viscous to the extent that it resists the flow of injected gas therethrough; while simultaneously cooling and making viscous the material in the rib to an extent less than that which resists the flow of injected gas therethrough.

2. The process of claim 1 characterized by thinning the wall to a greater distance from the sprue in the direction in which the rib runs, compared to the distance of thinning in other directions.

3. In a process of gas assisted injection molding of the type wherein an article is formed in a mold, the article having a rib with a hollow base and solid upper part, the rib upper part having a width narrower than the base; wherein heated molding material is injected into a relatively cool mold to thereby be cooled somewhat, and gas is then injected into the mold, to cause the gas to flow through and along the rib and thereby hollow the base of the rib; the improvement which comprises:

shaping the mold to make a rib having a substantially rectangular cross section base, a substantially rectangular cross section upper part and a stepped transition zone therebetween; the base width adjacent the transition zone substantially greater than the upper part width adjacent the transition zone; wherein, the shape of the rib causes cooling in the upper part and transition zone sufficient in degree, compared to the base, to cause the gas to flow preferentially through the base and not through the transition zone and upper part; to thereby more consistently make the base of the rib hollow and the upper part and transition zone solid.

4. The method of claim 3 wherein the width of the base adjacent the transition zone is greater than the width of the upper part adjacent the transition zone by at least a factor of two.

5. The process of claim 4 wherein the transition zone has a height of less than about 10 percent of the height of the rib.

6. In a process of gas assisted injection molding of the type wherein heated molding material is injected into a mold to form an article having a rib; wherein, following injection of molten molding material, gas is injected into the mold for the purpose of flowing through the rib to hollow the rib; and, wherein, the injected gas pushes molten molding material along the length of the rib from opposing directions and into a subsection of the rib, to thereby form the subsection as a solid rib subsection lacking any hollow, while adjacent rib portions are hollow; the improvement which comprises: narrowing the width of the rib in the vicinity of the subsection which is solid and which lacks any hollow, compared to the width of the adjacent rib portions which are hollow, to lessen distortion which would otherwise occur.

7. The process of claim 6 wherein the article has a plurality of intersecting hollow ribs, and wherein the rib portion which is solid and narrowed comprises a portion of a rib which connects two parallel hollow ribs.

* * * * *